US012809638B2

(12) United States Patent
Chen et al.

(10) Patent No.: US 12,809,638 B2
(45) Date of Patent: Nov. 24, 2026

(54) COMPUTING DEVICE MULTI-PATH INITIALIZATION SYSTEM

(71) Applicant: Dell Products L.P., Round Rock, TX (US)

(72) Inventors: Chih-Chung Chen, Taoyuan City (TW); Shih-Chieh Hsu, New Taipei City (TW)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/495,112

(22) Filed: Oct. 26, 2023

(65) Prior Publication Data

US 2025/0138832 A1 May 1, 2025

(51) Int. Cl.
*G06F 9/4401* (2018.01)

(52) U.S. Cl.
CPC .................................. *G06F 9/4405* (2013.01)

(58) Field of Classification Search
CPC ..................................................... G06F 9/4405
See application file for complete search history.

(56) References Cited

U.S. PATENT DOCUMENTS 8,510,543 B1 * 8/2013 Shankar .................. G06F 9/441
713/1
9,524,390 B2 12/2016 Kulkarni et al.
11,221,858 B1 * 1/2022 Hormuth ............... G06F 9/4416
2016/0070913 A1 * 3/2016 Kulkarni ............. H04L 63/0823
713/2
2018/0253555 A1 * 9/2018 Schumacher ......... G06F 9/4401
2020/0341744 A1 * 10/2020 Suryanarayana ......... G06F 8/65
2021/0165663 A1 * 6/2021 Liu ....................... G06F 9/4411
2023/0418506 A1 * 12/2023 Mane .................... G06F 3/0632

* cited by examiner

*Primary Examiner* — Jaweed A Abbaszadeh
*Assistant Examiner* — Ayman Fatima
(74) *Attorney, Agent, or Firm* — Joseph Mencher

(57) ABSTRACT

A multi-path initialization system includes a chassis. At least one storage device is housed in the chassis and includes an initialization path database storing respective initialization path information for each of a plurality of different initialization paths, and an initialization firmware volume database storing a plurality of initialization firmware volumes. An initialization subsystem is housed in the chassis, is coupled to the storage device(s), and receives an initialization path instruction to perform an initialization process according to an initialization path. The initialization subsystem identifies initialization path information for the initialization path that is included in the plurality of different initialization paths in the initialization path database, and identifies a subset of the plurality of initialization firmware volumes in the initialization firmware volume database based on the initialization path information. The initialization subsystem then performs the initialization process using the subset of the plurality of initialization firmware volumes.

20 Claims, 7 Drawing Sheets

COMPUTING DEVICE MULTI-PATH INITIALIZATION SYSTEM

BACKGROUND

The present disclosure relates generally to information handling systems, and more particularly to enabling the initialization of information handling systems via multiple paths.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art initialize using a Basic Input/Output System (BIOS) that is provided by BIOS firmware (e.g., via a BIOS image/binary). Furthermore, in different situations the BIOS in computing devices may require different functionality, which can raise some issues. For example, a "computing device provider" BIOS (e.g., a "DELL®" BIOS for computing devices provided by DELL® Inc. of Round Rock, Texas, United States) will not enable some processing system functionality for a processing system in the computing device (e.g., some chipset settings options for a chipset in the computing device will not be available in a BIOS setup for the BIOS) due to, for example, that processing system functionality only being used during development of the computing device and its BIOS. As such, during the development of the BIOS firmware that will provide the "computing device provider" BIOS, a plurality of different "test" BIOS firmware will be created to provide corresponding BIOS that include the processing system functionality needed during that stage of development (e.g., to be able to adjust chipset settings for the chipset), which is time consuming due to the need to identify that processing system functionality, request the creation of the BIOS firmware, wait until that BIOS firmware is created, etc.

During relatively early development stages of the computing device and/or BIOS, some conventional BIOS development techniques include using processing system provider reference code (e.g., INTEL® chipset reference code for chipsets provided by INTEL® Corp. of Santa Clara, California, United States) to create Customer Reference Board (CRB) BIOS firmware that includes CRB build flags that enable a CRB BIOS with a wider variety of processing system functionality (e.g., the chipset settings discussed above) without the need to create new BIOS firmware. However, at later development stages of the computing device and/or BIOS and following development of the computing device and/or BIOS, such CRB BIOS firmware presents some issues.

As will be appreciated by one of skill in the art, the CRB BIOS discussed above provides for operation of a CRB, but its CRM BIOS firmware must be modified and updated with computing device provider reference code (e.g., DELL® reference code for computing devices provided by DELL® Inc. of Round Rock, Texas, United States) to provide the computing device provider BIOS firmware discussed above that integrates the processing system provider reference code and the computing device provider reference code. Such computing device provider BIOS firmware with integrated processing system provider reference code and computing device provider reference code is difficult to maintain, as subsequent updates to the computing device provider BIOS firmware (e.g., during development of the computing device and/or BIOS and following development of the computing device and/or BIOS) tend to "fully" update the computing device provider reference code, but only update portions of the processing system provider reference code (e.g., by updating processing system provider chipset reference code, but not processing system provider platform reference code).

Accordingly, it would be desirable to provide for the initialization of computing devices while addressing the issues discussed above.

SUMMARY

According to one embodiment, an Information Handling System (IHS) includes a processing system; and a memory system that is coupled to the processing system and that includes instructions that, when executed by the processing system, cause the processing system to provide an initialization engine that is configured to: receive a first initialization path instruction to perform an initialization process according to a first initialization path; identify, in an initialization path database included in at least one storage device that is coupled to the processing system, first initialization path information for the first initialization path that is included in the plurality of different initialization paths; identify, in an initialization firmware volume database included in the at least one storage device based on the first initialization path information, a first subset of the plurality of initialization firmware volumes; and perform the initialization process using the first subset of the plurality of initialization firmware volumes.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
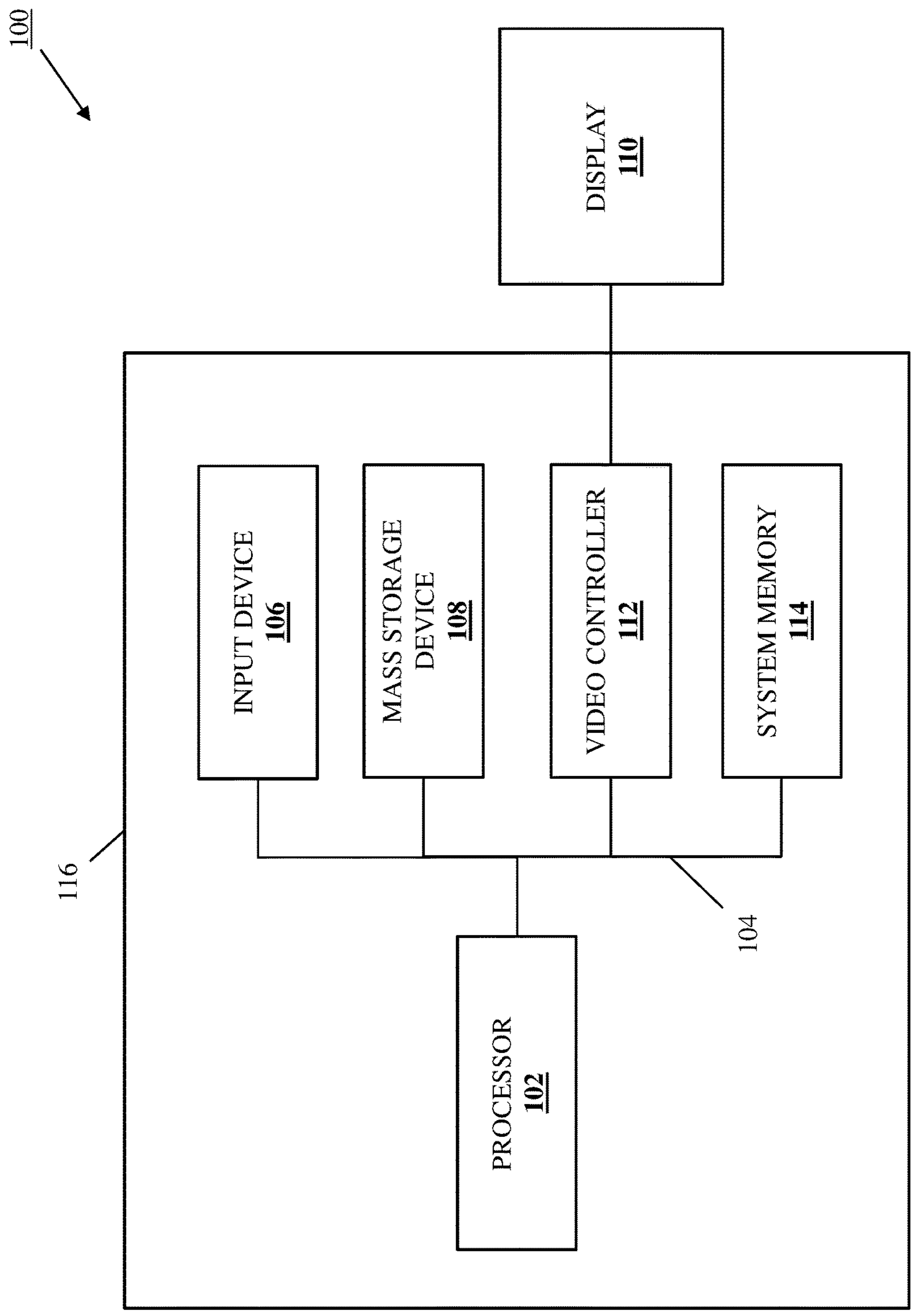
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
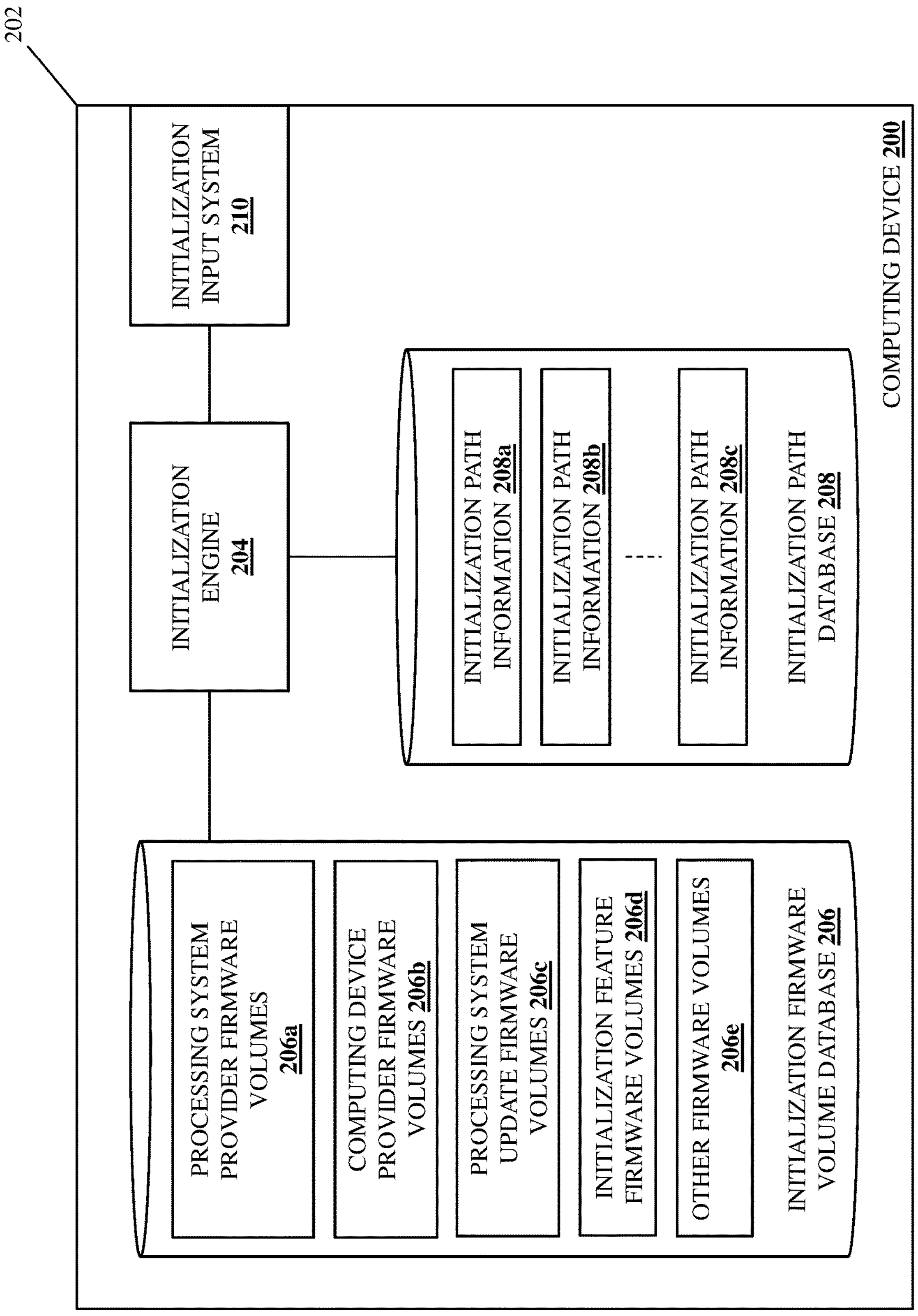
FIG. 2 is a schematic view illustrating an embodiment of a computing device that may include the computing device multi-path initialization system of the present disclosure.

Referring now to FIG. 2, an embodiment of a computing device 200 is illustrated that may provide the computing device multi-path initialization system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. Furthermore, while illustrated and discussed as being provided by specific computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions (e.g., provided in an initialization engine image/binary) that, when executed by the processing system, cause the processing system to provide an initialization engine 204 that is configured to perform the functionality of the initialization engines, initialization subsystems, and/or computing devices discussed below.

For example, one of skill in the art in possession of the present disclosure will appreciate how the initialization engine 204 may be provided by a Basic Input/Output System (BIOS) engine that is configured to provide a BIOS that is used to perform hardware initialization for the computing device 200 during an initialization process (e.g., a Power-On Startup) for the computing device 200, runtime services for an operating system and/or applications in the computing device 200, and/or other BIOS functionality that would be apparent to one of skill in the art in possession of the present disclosure. Furthermore, while described as providing a BIOS, one of skill in the art in possession of the present disclosure will appreciate how the initialization engine 204 may be provided by a Unified Extensible Firmware Interface (UEFI) engine that is configured to provide a UEFI according to the UEFI specification that defines an architecture of platform firmware used for initializing hardware in the computing device 200, its interface for interaction with an operating system in the computing device 200, and/or other UEFI functionality that would be apparent to one of skill in the art in possession of the present disclosure.

As will be appreciated by one of skill in the art in possession of the present disclosure, the initialization engine 204 may be provided using a single initialization engine image/binary (e.g., a BIOS image/binary or UEFI image/binary) that provides initialization engine firmware (e.g., BIOS firmware or UEFI firmware) that, as discussed in further detail below, uses the initialization firmware volumes of the present disclosure to provide a plurality of different initialization paths. However, while specific initialization engines have been described, one of skill in the art in possession of the present disclosure will appreciate how other initialization engines will fall within the scope of the present disclosure as well.

The chassis 202 may also house a storage system (not illustrated, but which may include the storage 108 discussed above with reference to FIG. 1) that is coupled to the initialization engine 204 (e.g., via a coupling between the storage system and the processing system) and that includes an initialization firmware volume database 206 that is configured to store initialization firmware volumes utilized by the initialization engine 204 for the initialization process discussed below. In the specific example illustrated and described herein, the initialization firmware volume database 206 stores processing system provider firmware volumes 206*a* that may include initialization firmware volumes that may be provided by a processing system provider that provides a processing system (e.g., a chipset) in the computing device 200, and that may include a processing system provider boot firmware volume (e.g., an INTEL® boot firmware volume provided by INTEL® Corp. of Santa Clara, California, United States), a processing system provider setup firmware volume (e.g., an INTEL® setup firmware volume provided by INTEL® Corp. of Santa Clara, California, United States), and/or other processing system provider firmware volumes that would be apparent to one of skill in the art in possession of the present disclosure.

In the specific example illustrated and described herein, the initialization firmware volume database 206 also stores computing device provider firmware volumes 206*b* that may include initialization firmware volumes provided by a computing device provider that provides a computing device 200, and that may include a computing device provider boot firmware volume (e.g., a DELL® boot firmware volume provided by DELL® Inc. of Round Rock, Texas, United States), a computing device provider setup firmware volume (e.g., an DELL® setup firmware volume provided by DELL® Inc. of Round Rock, Texas, United States), and/or other computing device provider firmware volumes that would be apparent to one of skill in the art in possession of the present disclosure.

In the specific example illustrated and described herein, the initialization firmware volume database 206 also stores processing system update firmware volumes 206*c* that may include initialization firmware volumes that provide updates the processing system in the computing device 200 (e.g., INTEL® Firmware Support Package (FSP) firmware volumes provided by INTEL® Corp. of Santa Clara, California, United States), and/or other processing system update firmware volumes that would be apparent to one of skill in the art in possession of the present disclosure. In the specific example illustrated and described herein, the initialization firmware volume database 206 also stores initialization feature firmware volumes 206*d* that may include initialization firmware volumes that provide any of a variety of BIOS/UEFI features for a BIOS/UEFI in the computing device 200 (e.g., a DELL® BIOS/UEFI features firmware volume provided by DELL® Inc. of Round Rock, Texas, United States), and/or other initialization feature firmware volumes that would be apparent to one of skill in the art in possession of the present disclosure.

In the specific example illustrated and described herein, the initialization firmware volume database 206 also stores other firmware volumes 206*e* that may include any other initialization firmware volumes such as the platform driver firmware volume, the cloud driver firmware volume, and/or any other initialization firmware volumes that would be apparent to one of skill in the art in possession of the present disclosure. However, while several specific examples of initialization firmware volumes have been illustrated and described, one of skill in the art in possession of the present disclosure will appreciate how any initialization firmware volumes that provide any initialization functionality will fall within the scope of the present disclosure as well.

In an embodiment, the storage system housed in the chassis 202 also includes an initialization path database 208 that is configured to store initialization path information utilized by the initialization engine 204 for the initialization process discussed below. In the specific examples provided below, the initialization path database 208 includes initialization path information 208*a* that provides a processing system provider initialization path that has been defined by a processing system provider (e.g., INTEL® Corp. of Santa Clara, California, United States) that provides a processing system (e.g., a chipset) in the computing device 200, initialization path information 208*b* that provides a computing device provider initialization path that has been defined by a computing device provider (e.g., DELL® Inc. of Round Rock, Texas, United States) that provides the computing device 200, and initialization path information 208*c* that provides a cloud initialization path that configures the computing device 200 to operate in a cloud environment. However, while a few specific examples of specific initialization path information are illustrated and described, one of skill in the art in possession of the present disclosure will appreciate how other initialization path information that enables other initialization paths will fall within the scope of the present disclosure as well.

The chassis 202 may also house an initialization input system 210 that is coupled to the initialization engine 204 (e.g., via a coupling between the initialization input system 210 and the processing system) and that may be provided by a keyboard, a Network Interface Controller (NIC), and/or any other input components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the multi-path initialization functionality discussed below, while remaining within the scope of the present disclosure as well.

Figure 3A:
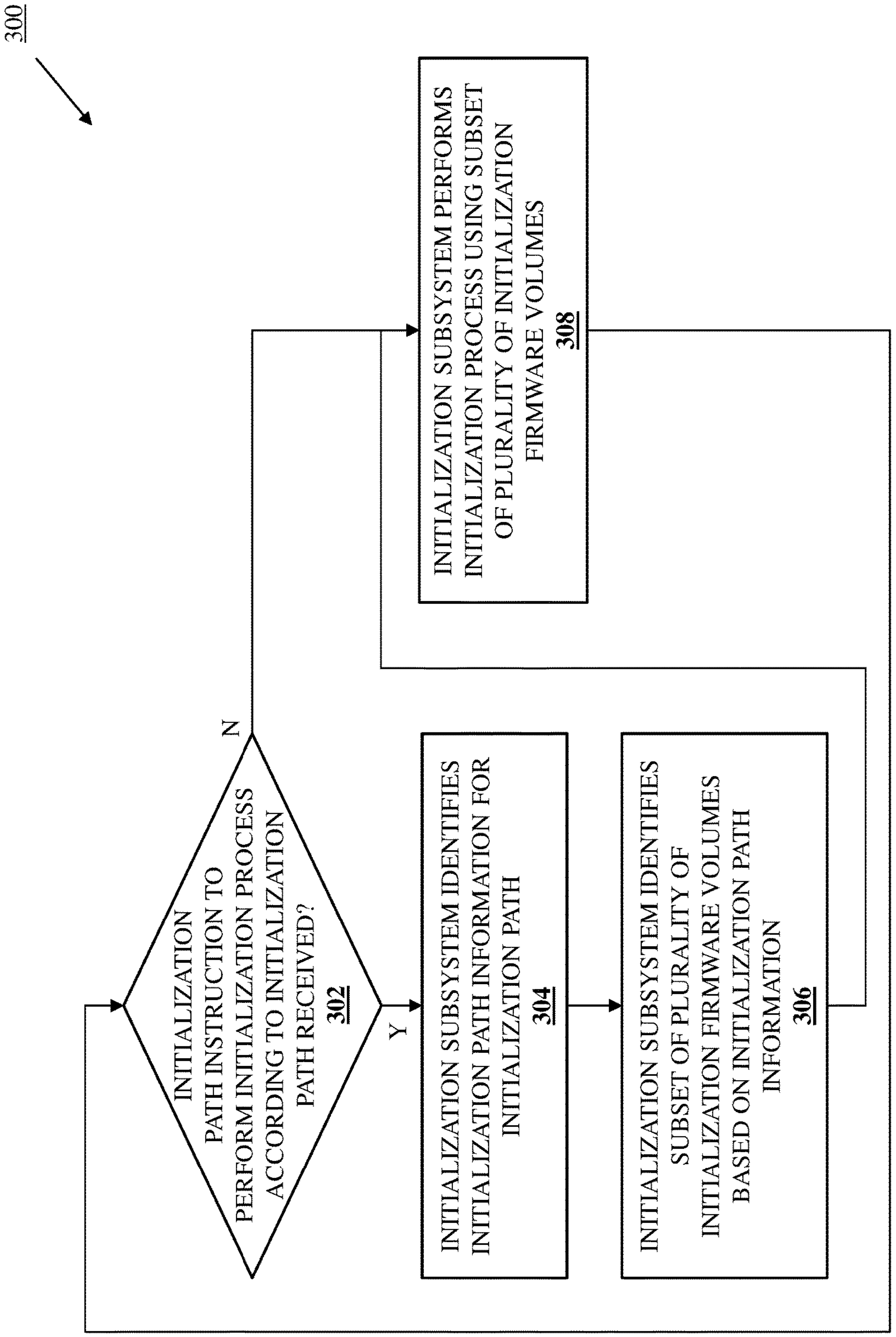
FIG. 3A is a flow chart illustrating an embodiment of a method for initializing a computing device via multiple paths.

Referring now to FIG. 3A, an embodiment of a method 300 for initializing a computing device via multiple paths is illustrated. As discussed below, the systems and methods of the present disclosure use a single initialization engine image/binary including initialization engine firmware that provides an initialization engine that is configured to initialize a computing device via any one of multiple different initialization paths. For example, the computing device multi-path initialization system of the present disclosure may include a chassis. At least one storage device is housed in the chassis and includes an initialization path database storing respective initialization path information for each of a plurality of different initialization paths, and an initialization firmware volume database storing a plurality of initialization firmware volumes. An initialization subsystem is housed in the chassis, is coupled to the storage device(s), and receives an initialization path instruction to perform an initialization process according to an initialization path. The initialization subsystem identifies initialization path information for the initialization path that is included in the plurality of different initialization paths in the initialization path database, and identifies a subset of the plurality of initialization firmware volumes in the initialization firmware volume database based on the initialization path information. The initialization subsystem then performs the initialization process using the subset of the plurality of initialization firmware volumes. As such, computing devices may be initialized with different functionality without the need to develop respective separate initialization engine firmware to enable that functionality, and without the maintenance requirements of CRB BIOS engines discussed above.

The method 300 begins at decision block 302 where the method 300 proceeds depending on whether an initialization path instruction to perform an initialization process according to an initialization path has been received. As discussed below, the initialization engine 204 in the computing device 200 may receive an initialization path instruction to initialize using a particular initialization path, and may enable that initialization path as described below and then subsequently initialize using that initialization path until a new initialization path instruction is received. As such, in an embodiment of decision block 302, the method 300 may proceed depending on whether the initialization engine 204 receives an initialization path instruction. If, at decision block 302 the initialization engine 204 does not receive an initialization path instruction, the method 300 proceeds to block 308, discussed in further detail below.

Figure 4:
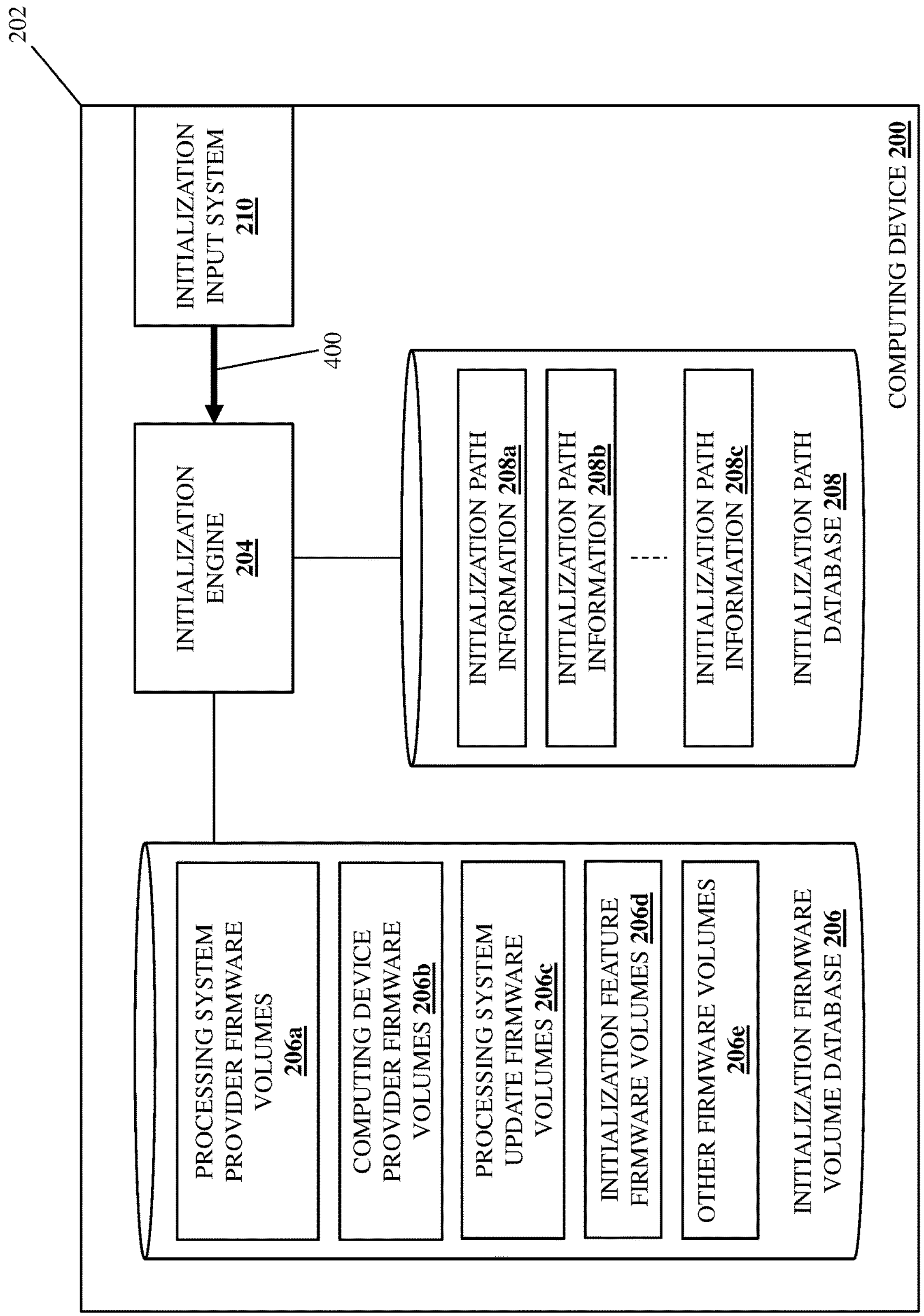
FIG. 4 is a schematic view illustrating an embodiment of the computing device of FIG. 2 operating during the method of FIG. 3A.

If, at decision block 302, the initialization path instruction to perform the initialization process according to an initialization path has been received, the method 300 proceeds to block 304 where an initialization subsystem identifies initialization path information for the initialization path. With reference to FIG. 4, in an embodiment of decision block 302, the initialization engine 204 may perform initialization path instruction receiving operations 400 that may include receiving an initialization path instruction via the initialization input system 210. For example, a user of the computing device 200 may cause the computing device 200 to enter an initialization setup mode (e.g., a BIOS setup mode) during runtime (e.g., by instructing a reboot of the computing device 200) or during initialization (e.g., by selecting an initialization setup mode key such as an "F2" key to enter a BIOS setup mode) of the computing device 200. The user may then generate the initialization path instruction by selecting any of the initialization paths described below, and/or performing any other actions that one of skill in the art in possession of the present disclosure would recognize as providing the initialization path instruction that identifies the initialization path described below, in order to cause that initialization path instruction to be transmitted to the initialization engine 204.

In another example, a user of the computing device 200 may select any of the initialization paths described below, and/or perform any other actions that one of skill in the art in possession of the present disclosure would recognize as providing the initialization path instruction that identifies the initialization path described below, in order to generate the initialization path instruction during runtime of the computing device 200 (e.g., while an operating system in the computing device 200 controls the computing device 200). As will be appreciated by one of skill in the art in possession of the present disclosure, such runtime initialization path instruction generation may be performed via a Baseboard Management Controller (BMC) device (e.g., an integrated DELL® Remote Access Controller (iDRAC) device), an operating system, or other application, and may result in the computing device 200 rebooting in order to cause that initialization path instruction to be transmitted to the initialization engine 204. However, while two specific examples have been provided, one of skill in the art in possession of the present disclosure will appreciate how the initialization path instruction may be provided to the initialization engine 204 in a variety of manners that will fall within the scope of the present disclosure as well.

Figure 5:
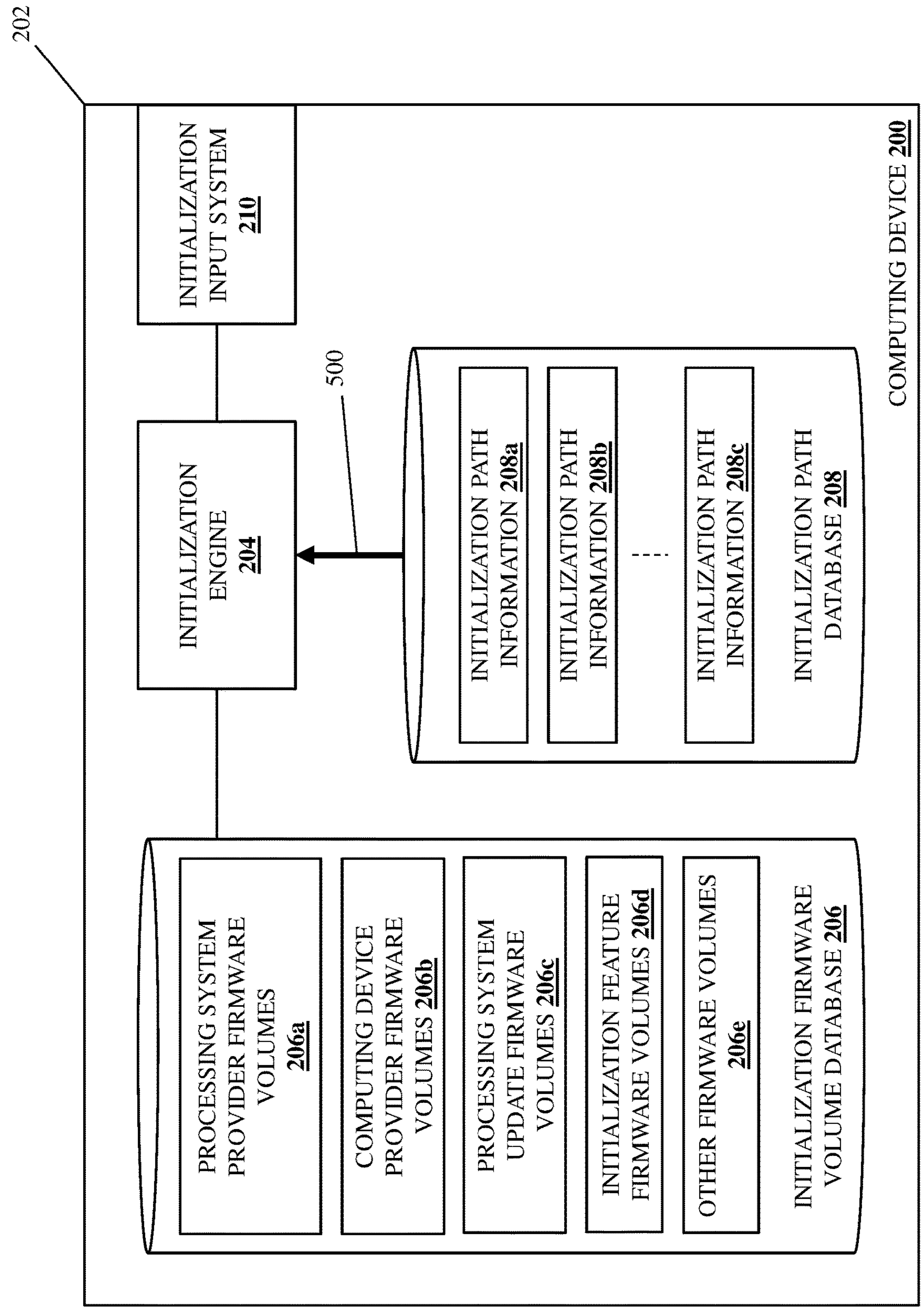
FIG. 5 is a schematic view illustrating an embodiment of the computing device of FIG. 2 operating during the method of FIG. 3A.

With reference to FIG. 5, in an embodiment of block 304 and in response to receiving the initialization path instruction, the initialization engine 204 may perform initialization path retrieval operations 500 that may include determining the initialization path identified by the initialization path instruction, accessing the initialization path database 208, and retrieving the initialization path information associated with that initialization path. To provide a specific example, the initialization path identified by the initialization path instruction may be the processing system provider initialization path described below that may enable a plurality of processing system functionality in the computing device 200 (e.g., a plurality of chipset settings options for a chipset provided by INTEL® Corp. of Santa Clara, California, United States) that may be useful during development of the computing device 200 and that may not be as useful following development and during production of the computing device 200.

As such, at block 304, the initialization engine 204 may identify the processing system provider initialization path in the initialization path instruction received at decision block 302, and retrieve the initialization path information **208*a* that, in this specific example, identifies initialization firmware volumes that may be executed by the initialization engine 204 in order to initialize the computing device 200 on the processing system provider initialization path. Furthermore, while a single processing system provider initialization path is described, one of skill in the art in possession of the present disclosure will appreciate how multiple processing system provider initialization paths may be available to a user for provisioning in an initialization path instruction in order to, for example, enable different processing system functionality in the computing device 200** (e.g., different chipset settings options for a chipset provided by INTEL® Corp. of Santa Clara, California, United States) while remaining within the scope of the present disclosure as well.

To provide another specific example, the initialization path identified by the initialization path instruction may be the computing device provider initialization path described below that may provide runtime functionality in the computing device 200 (e.g., a BIOS/UEFI that is configured to initialize a production computing device provided by DELL® Inc. of Round Rock, Texas, United States) that may not provide the processing system functionality in the computing device 200 that is provided by the processing system provider initialization paths described above. As such, at block 304, the initialization engine 204 may identify the computing device provider initialization path in the initialization path instruction received at decision block 302, and retrieve the initialization path information **208*b* that, in this specific example, identifies initialization firmware volumes that may be executed by the initialization engine 204 in order to initialize the computing device 200 on the computing device provider initialization path. Furthermore, while a single computing device provider initialization path is described, one of skill in the art in possession of the present disclosure will appreciate how multiple computing device provider initialization paths may be available to a user for provisioning in an initialization path instruction in order to, for example, enable different functionality in the computing device 200** while remaining within the scope of the present disclosure as well.

To provide another specific example, the initialization path identified by the initialization path instruction may be the cloud initialization path described below that may provide cloud functionality in the computing device 200 that may provide different functionality than the processing system provider initialization paths and computing device provider initialization paths described above. As such, at block 304, the initialization engine 204 may identify the cloud initialization path in the initialization path instruction received at decision block 302, and retrieve the initialization path information 208*c* that, in this specific example, identifies initialization firmware volumes that may be executed by the initialization engine 204 in order to initialize the computing device 200 on the cloud initialization path. Furthermore, while a single cloud initialization path is described, one of skill in the art in possession of the present disclosure will appreciate how multiple cloud initialization paths or other initialization paths may be available to a user for provisioning in an initialization path instruction in order to, for example, enable different functionality in the computing device 200 while remaining within the scope of the present disclosure as well. However, while a few specific initialization paths have been described, one of skill in the art in possession of the present disclosure will appreciate how initialization path information for any of a variety of initialization paths may be retrieved similarly as described above while remaining within the scope of the present disclosure.

Figure 6:
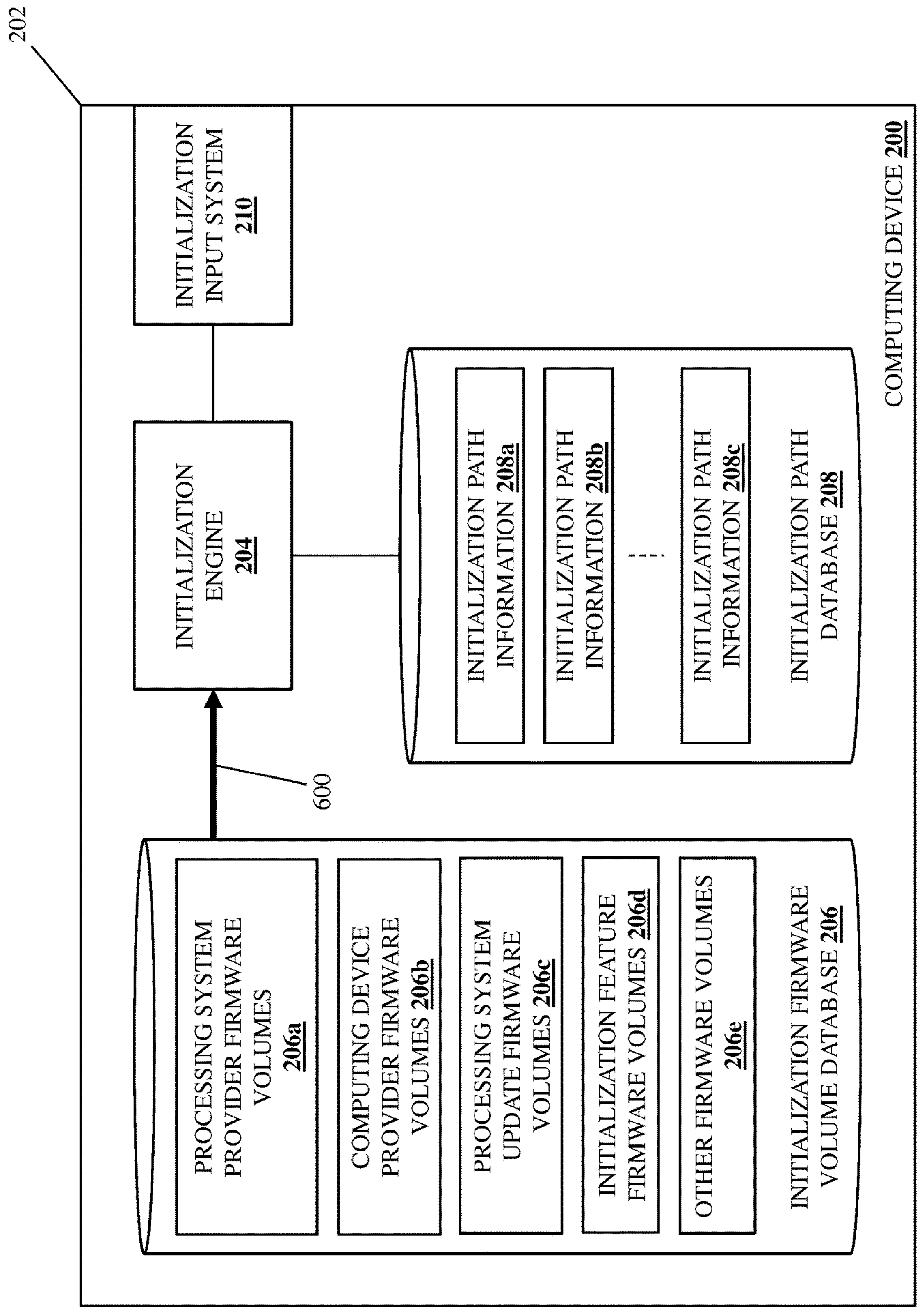
FIG. 6 is a schematic view illustrating an embodiment of the computing device of FIG. 2 operating during the method of FIG. 3A.

The method 300 then proceeds to block 306 where the initialization subsystem identifies a subset of a plurality of initialization firmware volumes based on the initialization path information. With reference to FIG. 6, in an embodiment of block 306, the initialization engine 204 may perform initialization firmware retrieval operations 600 that include determining a subset of the initialization firmware volumes that are identified in the initialization path information that was retrieved at block 304, and retrieving that subset of the initialization firmware volumes from the initialization firmware volume database 206. As will be appreciated by one of skill in the art in possession of the present disclosure, while a few simplified and specific examples are described below, one of skill in the art in possession of the present disclosure will appreciate how any of a variety of initialization firmware volumes may be identified in initialization path information for an initialization path and retrieved from the initialization firmware volume database 206 while remaining within the scope of the present disclosure.

Continuing with the specific example provided above and described in further detail below in which the initialization path information is for a processing system provider initialization path, at block 306 the initialization engine 204 may determine that one or more of the processing system update firmware volumes 206*c* are identified in the initialization path information 208*a*, that a processing system provider boot firmware volume in the processing system provider firmware volumes 206*a* is identified in the initialization path information 208*a*, that a processing system provider setup firmware volume in the processing system provider firmware volumes 206*a* is identified in the initialization path information 208*a*, and/or that any other initialization firmware volumes that would be apparent to one of skill in the art in possession of the present disclosure (e.g., the initialization feature firmware volumes 206*d*) are identified in the initialization path information 208*a*. In response, the initialization firmware retrieval operations 600 may include retrieving the one or more of the processing system update firmware volumes 206*c*, the processing system provider boot firmware volume in the processing system provider firmware volumes 206*a*, the processing system provider setup firmware volume in the processing system provider firmware volumes 206*a*, and/or that any other initialization firmware volumes that would be apparent to one of skill in the art in possession of the present disclosure (e.g., the initialization feature firmware volumes 206*d*) from the initialization firmware volume database 206.

Continuing with the specific example provided above and described in further detail below in which the initialization path information is for a computing device provider initialization path, at block 306 the initialization engine 204 may determine that one or more of the processing system update firmware volumes 206*c* are identified in the initialization path information 208*b*, that a computing device provider boot firmware volume in the computing device provider firmware volumes 206*b* is identified in the initialization path information 208*b*, that a computing device provider setup firmware volume in the computing device provider firmware volumes 206*b* is identified in the initialization path information 208*b*, and/or that any other initialization firmware volumes that would be apparent to one of skill in the art in possession of the present disclosure (e.g., the initialization feature firmware volumes 206*d*) are identified in the initialization path information 208*b*. In response, the initialization firmware retrieval operations 600 may include retrieving the one or more of the processing system update firmware volumes 206*c*, the computing device provider boot firmware volume in the computing device provider firmware volumes 206*b*, the computing device provider setup firmware volume in the computing device provider firmware volumes 206*b*, and/or that any other initialization firmware volumes that would be apparent to one of skill in the art in possession of the present disclosure (e.g., the initialization feature firmware volumes 206*d*) from the initialization firmware volume database 206.

Continuing with the specific example provided above and described in further detail below in which the initialization path information is for a cloud initialization path, at block 306 the initialization engine 204 may determine that one or more of the processing system update firmware volumes 206*c* are identified in the initialization path information 208*c*, that a platform firmware volume in the other firmware volumes 206*e* is identified in the initialization path information 208*c*, that a cloud driver firmware volume in the other firmware volumes 206*e* is identified in the initialization path information 208*c*, and/or that any other initialization firmware volumes that would be apparent to one of skill in the art in possession of the present disclosure (e.g., the initialization feature firmware volumes 206*d*) are identified in the initialization path information 208*b*. In response, the initialization firmware retrieval operations 600 may include retrieving the one or more of the processing system update firmware volumes 206*c*, the computing device provider boot firmware volume in the computing device provider firmware volumes 206*b*, the computing device provider setup firmware volume in the computing device provider firmware volumes 206*b*, and/or that any other initialization firmware volumes that would be apparent to one of skill in the art in possession of the present disclosure (e.g., the initialization feature firmware volumes 206*d*) from the initialization firmware volume database 206.

Following block 306, or if no initialization path instruction to perform an initialization process according to an initialization path is received at decision block 302, the method 300 then proceeds to block 308 where the initialization subsystem performs the initialization process using the subset of the plurality of initialization firmware volumes. As such, one of skill in the art in possession of the present disclosure will appreciate how the initialization process described below may be performed using the initialization firmware volumes retrieved as described above in response to receiving the initialization path instruction, or may be performed using initialization firmware volumes that were retrieved during a previous performance of the method 300 (e.g., in response to a power on, reset, reboot, and/or other initialization of the computing device 200 that does not include the initialization path instruction).

Figure 3B:
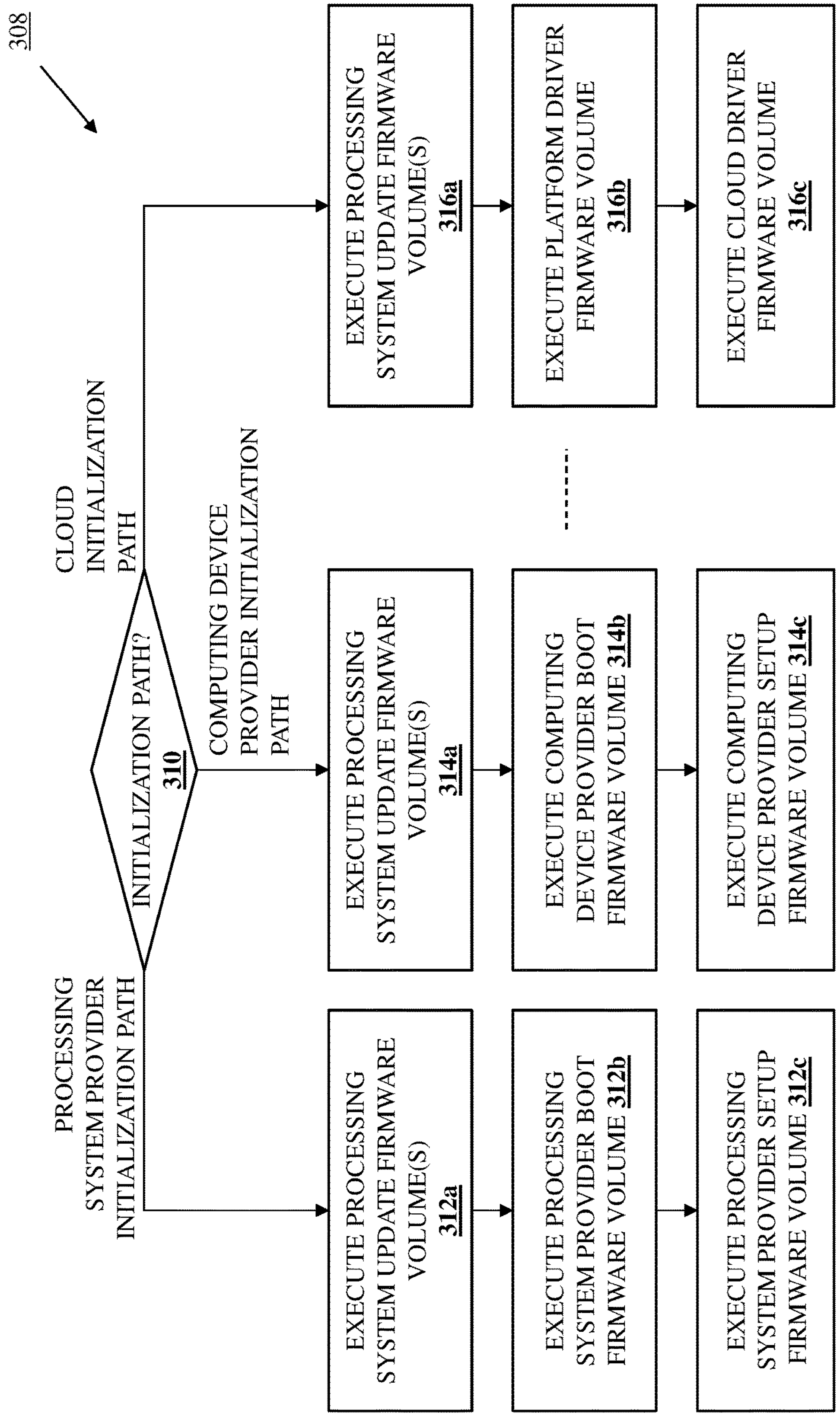
FIG. 3B is a flow chart illustrating an embodiment of a sub-method for performing a block in the method of FIG. 3A.

In an embodiment, at block 308, the initialization engine 204 may use the initialization firmware volumes retrieved at block 306 to perform an initialization process (e.g., a boot process) that initializes the computing device 200 and, for example, causes the computing device 200 to enter a runtime state in which an operating system controls the computing device 200. With reference to FIG. 3B, a specific example of block 308 is illustrated that is directed to the specific examples provided above in which a processing system provider initialization path, a computing device provider initialization path, and a cloud initialization path are available for the initialization process. As such, in this embodiment, block 308 may begin with decision sub-block 310 where the block 308 proceeds depending on the initialization path instructed via the initialization path instruction.

If, at decision sub-block 310, a processing system provider initialization path was identified in the initialization path instruction, block 308 proceeds to sub-block 312*a* where the processing system update firmware volume(s) that were retrieved at block 306 are executed, followed by sub-block 312*b* where the processing system provider boot firmware volume that was retrieved at block 306 is executed, followed by sub-block 312*c* where the processing system provider setup firmware volume that was retrieved at block 306 is executed, followed by the execution of any other initialization firmware volumes that would be apparent to one of skill in the art in possession of the present disclosure. In some embodiments, one of skill in the art in possession of the present disclosure will appreciate how the initialization path information 208*a* for the processing system provider initialization path may identify a sequence for executing the initialization firmware volumes (e.g., first executing the processing system update firmware volume(s), then executing the processing system provider boot firmware volume, and then executing the processing system provider setup firmware volume), and how the initialization engine 204 may execute those initialization firmware volumes in that sequence in order to complete the initialization process for the computing device 200.

If, at decision sub-block 310, a computing device provider initialization path was identified in the initialization path instruction, block 308 proceeds to sub-block 314*a* where the processing system update firmware volume(s) that were retrieved at block 306 are executed, followed by sub-block 314*b* where the computing device provider boot firmware volume that was retrieved at block 306 is executed, followed by sub-block 314*c* where the computing device provider setup firmware volume that was retrieved at block 306 is executed, followed by the execution of any other initialization firmware volumes that would be apparent to one of skill in the art in possession of the present disclosure. In some embodiments, one of skill in the art in possession of the present disclosure will appreciate how the initialization path information 208*b* for the computing device provider initialization path may identify a sequence for executing the initialization firmware volumes (e.g., first executing the processing system update firmware volume(s), then executing the computing device provider boot firmware volume, then executing the computing device provider setup firmware volume), and how the initialization engine 204 may execute those initialization firmware volumes in that sequence in order to complete the initialization process for the computing device 200.

If, at decision sub-block 310, a cloud initialization path was identified in the initialization path instruction, block 308 proceeds to sub-block 316*a* where the processing system update firmware volume(s) that were retrieved at block 306 are executed, followed by sub-block 316*b* where the platform driver firmware volume that was retrieved at block 306 is executed, followed by sub-block 316*c* where the cloud driver firmware volume that was retrieved at block 306 is executed, followed by the execution of any other initialization firmware volumes that would be apparent to one of skill in the art in possession of the present disclosure. In some embodiments, one of skill in the art in possession of the present disclosure will appreciate how the initialization path information 208*c* for the cloud initialization path may identify a sequence for executing the initialization firmware volumes (e.g., first executing the processing system update firmware volume(s), then executing the platform driver firmware volume, then executing the cloud driver firmware volume), and how the initialization engine 204 may execute those initialization firmware volumes in that sequence in order to complete the initialization process for the computing device 200.

Following block 308, the method 300 returns to decision block 302. As such, the method 300 may loop such that the initialization engine 304 will continue to perform the initialization process for the computing device 200 (e.g., in response to a power on, reset, reboot, and/or other initialization of the computing device 200 that does not include the initialization path instruction) using the initialization firmware volumes that were most recently retrieved during a previous performance of the method 300 that provided the currently-selected initialization path until a new initialization path instruction is received that causes the subsequent retrieval and execution of initialization firmware volumes that provide a new initialization path.

Thus, systems and methods have been described that use a single initialization engine image/binary that includes initialization engine firmware that provides an initialization engine that is configured to initialize a computing device via any one of multiple different initialization paths. For example, the computing device multi-path initialization system of the present disclosure may include a chassis. At least one storage device is housed in the chassis and includes an initialization path database storing respective initialization path information for each of a plurality of different initialization paths, and an initialization firmware volume database storing a plurality of initialization firmware volumes. An initialization subsystem is housed in the chassis, is coupled to the storage device(s), and receives an initialization path instruction to perform an initialization process according to an initialization path. The initialization subsystem identifies initialization path information for the initialization path that is included in the plurality of different initialization paths in the initialization path database, and identifies a subset of the plurality of initialization firmware volumes in the initialization firmware volume database based on the initialization path information. The initialization subsystem then performs the initialization process using the subset of the plurality of initialization firmware volumes. As such, computing devices may be initialized with different functionality without the need to develop respective separate initialization engine firmware to enable that functionality, and without the maintenance requirements of CRB BIOS engines discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-path initialization system, comprising:

a chassis that houses a plurality of components that provide a computing device;

at least one storage device that is included in the plurality of components, that is housed in the chassis, and that includes:

an initialization path database that includes respective initialization path information for a plurality of different initialization paths that are each configured to provide respective functionality that is different than functionality provided by other initialization paths included in the plurality of different initialization paths; and an initialization firmware volume database having a plurality of initialization firmware volumes that include a processing system provider boot firmware volume, a processing system provider setup firmware volume, a computing device provider boot firmware volume, a computing device provider setup firmware volume, and at least one processing system update firmware volume; and an initialization subsystem that is provided by at least some of the plurality of components, that is housed in the chassis, that is coupled to the at least one storage device, and that is configured to:

receive a first initialization path instruction to perform an initialization process according to a processing system provider initialization path that is included in the plurality of different initialization paths and that is configured to initialize the computing device, cause the computing device to enter a runtime state, and provide processing system provider functionality that is different than functionality provided by the other initialization paths and, in response to receiving the first initialization path instruction:

identify, in the initialization path database for the processing system provider initialization path, processing system provider initialization path information that identifies the processing system provider boot firmware volume, the processing system provider setup firmware volume, and the at least one processing system update firmware volume for the processing system provider initialization path;

retrieve, from the initialization firmware volume database, the processing system provider boot firmware volume, the processing system provider setup firmware volume, and the at least one processing system update firmware volume identified by the processing system provider initialization path information; and perform the initialization process according to the processing system provider initialization path by executing the processing system provider boot firmware volume, the processing system provider setup firmware volume, and the at least one processing system update firmware volume in an order defined by the processing system provider initialization path information;

receive a second initialization path instruction to perform the initialization process according to a computing device provider initialization path that is included in the plurality of different initialization paths and that is configured to initialize the computing device, cause the computing device to enter a runtime state, and provide computing device provider functionality that is different than functionality provided by the other initialization paths included in the plurality of different initialization paths and, in response to receiving the second initialization path instruction:

identify, in the initialization path database for the computing device provider initialization path, computing device provider initialization path information that identifies the computing device provider boot firmware volume, the computing device provider setup firmware volume, and the at least one processing system update firmware volume for the computing device provider initialization path;

retrieve, from the initialization firmware volume database, the computing device provider boot firmware volume, the computing device provider setup firmware volume, and the at least one processing system update firmware volume identified by the computing device provider initialization path information; and perform the initialization process according to the computing device provider initialization path by executing the computing device provider boot firmware volume, the computing device provider setup firmware volume, and the at least one processing system update firmware volume in an order defined by the computing device provider initialization path information.

2. The system of claim 1, wherein the plurality of different initialization paths includes a cloud initialization path configured to provide cloud functionality in the computing device, and wherein the initialization subsystem is configured to:

receive a third initialization path instruction to perform the initialization process according to a cloud provider initialization path that is included in the plurality of different initialization paths and that is configured to initialize the computing device, cause the computing device to enter a runtime state, and provide cloud provider functionality that is different than functionality provided by the other initialization paths included in the plurality of different initialization paths and, in response to receiving the third initialization path instruction:

identify, in the initialization path database for the cloud initialization path, cloud initialization path information that identifies a platform driver firmware volume, the at least one processing system update firmware volume, and a cloud driver firmware volume;

retrieve, from the initialization firmware volume database, the platform driver firmware volume, the at least one processing system update firmware volume, and the cloud driver firmware volume identified by the cloud initialization path information; and perform the initialization process according to the cloud initialization path by executing the platform driver firmware volume, the at least one processing system update firmware volume, and the cloud driver firmware volume in an order defined by the cloud initialization path information.

3. The system of claim 1, wherein the at least one storage device includes a Serial Peripheral Interface (SPI) storage device.

4. The system of claim 1, wherein the initialization subsystem is provided using a single initialization engine image that provides initialization engine firmware configured to initialize the computing device via any one of the plurality of different initialization paths using respective initialization firmware volumes retrieved from the initialization firmware volume database.

5. The system of claim 1, wherein the initialization subsystem is configured to receive the first initialization path instruction during runtime of the computing device via a Baseboard Management Controller (BMC) device, an operating system, or an application, and cause the computing device to reboot to perform the initialization process according to the processing system provider initialization path or the computing device provider initialization path identified by the first initialization path instruction.

6. The system of claim 1, wherein the plurality of different initialization paths includes a plurality of processing system provider initialization paths that are each available for provisioning in an initialization path instruction and that each enable different processing system functionality in the computing device.

7. An Information Handling System (IHS), comprising:

a processing system that is configured to be housed in a chassis; and a memory system that is configured to be housed in the chassis, that is coupled to the processing system, and that includes instructions that, when executed by the processing system, cause the processing system to provide an initialization engine that is configured to:

receive a first initialization path instruction to perform an initialization process according to a processing system provider initialization path that is included in a plurality of different initialization paths and that is configured to initialize the IHS, cause the IHS to enter a runtime state, and provide processing system provider functionality that is different than functionality provided by other initialization paths included in tje plurality of different initialization paths and, in response to receiving the first initialization path instruction:

identify, in an initialization path database included in at least one storage device that is coupled to the processing system and for the processing system provider initialization path, processing system provider initialization path information that identifies a processing system provider boot firmware volume, a processing system provider setup firmware volume, and at least one processing system update firmware volume for the processing system provider initialization path;

retrieve, from an initialization firmware volume database included in the at least one storage device, the processing system provider boot firmware volume, the processing system provider setup firmware volume, and the at least one processing system update firmware volume identified by the processing system provider initialization path information; and perform the initialization process according to the processing system provider initialization path by executing the processing system provider boot firmware volume, the processing system provider setup firmware volume, and the at least one processing system update firmware volume in an order defined by the processing system provider initialization path information;

receive a second initialization path instruction to perform the initialization process according to an IHS provider initialization path that is included in the plurality of different initialization paths and that is configured to initialize the IHS, cause the IHS to enter a runtime state, and provide IHS provider functionality that is different than functionality provided by the other initialization paths included in a plurality of different initialization paths and, in response to receiving the second initialization path instruction:

identify, in the initialization path database for the IHS provider initialization path, IHS provider initialization path information that identifies an IHS provider boot firmware volume, an IHS provider setup firmware volume, and at least one processing system update firmware volume for the IHS provider initialization path;

retrieve, from the initialization firmware volume database, the IHS provider boot firmware volume, the IHS provider setup firmware volume, and the at least one processing system update firmware volume identified by the IHS provider initialization path information; and perform the initialization process according to the IHS provider initialization path by executing the IHS provider boot firmware volume, the computing device provider setup firmware volume, and the at least one processing system update firmware volume in an order defined by the IHS provider initialization path information.

8. The IHS of claim 7, wherein the initialization subsystem is configured to:

receive a third initialization path instruction to perform the initialization process according to a cloud provider initialization path that is included in the plurality of different initialization paths and that is configured to initialize the IHS, cause the IHS to enter a runtime state, and provide cloud provider functionality that is different than functionality provided by the other initialization paths included in a plurality of different initialization paths and, in response to receiving the third initialization path instruction;

identify, in the initialization path database for the cloud initialization path, cloud initialization path information that identifies a platform driver firmware volume, the at least one processing system update firmware volume, and a cloud driver firmware volume;

retrieve, from the initialization firmware volume database, the platform driver firmware volume, the at least one processing system update firmware volume, and the cloud driver firmware volume identified by the cloud initialization path information; and perform the initialization process according to the cloud initialization path by executing the platform driver firmware volume, the at least one processing system update firmware volume, and the cloud driver firmware volume in an order defined by the cloud initialization path information.

9. The IHS of claim 7, wherein the at least one storage device includes a Serial Peripheral Interface (SPI) storage device.

10. The IHS of claim 7, wherein the initialization subsystem is provided using a single initialization engine image that provides initialization engine firmware configured to initialize the IHS via any one of the plurality of different initialization paths using respective initialization firmware volumes retrieved from the initialization firmware volume database.

11. The IHS of claim 7, wherein the initialization subsystem is configured to receive the first initialization path instruction during runtime of the IHS via a Baseboard Management Controller (BMC) device, an operating system, or an application, and cause the IHS to reboot to perform the initialization process according to the processing system provider initialization path or the IHS provider initialization path identified by the first initialization path instruction.

12. The IHS of claim 7, wherein the plurality of different initialization paths includes a plurality of processing system provider initialization paths that are each available for provisioning in an initialization path instruction and that each enable different processing system functionality in the IHS.

13. The IHS of claim 7, wherein the plurality of initialization firmware volumes includes initialization feature firmware volumes that provide BIOS or UEFI features for the IHS, and wherein at least one of the processing system provider initialization path information or the IHS provider initialization path information identifies at least one of the initialization feature firmware volumes for retrieval from the initialization firmware volume database and execution during the initialization process.

14. A method initializing a computing device via multiple paths, comprising:

receiving, by an initialization subsystem that is provided by at least some of a plurality of components that are housed in a chassis and that provide a computing device, a first initialization path instruction to perform an initialization process according to a processing system provider initialization path that is included in a plurality of different initialization paths and that is configured to initialize the computing device, cause the computing device to enter a runtime state, and provide processing system provider functionality that is different than functionality provided by other initialization paths included in the plurality of different initialization paths and, in response to receiving the first initialization path instruction:

identifying, by the initialization subsystem in an initialization path database included in at least one storage device that is coupled to the initialization subsystem for the processing system provider initialization path, processing system provider initialization path information that identifies processing system provider boot firmware volume, processing system provider setup firmware volume, and at least one processing system update firmware volume for the processing system provider first initialization path;

retrieving, from the initialization subsystem in an initialization firmware volume database included in the at least one storage device, the processing system provider boot firmware volume, the processing system provider setup firmware volume, and the at least one processing system update firmware volume identified by the processing system provider initialization path information; and performing, by the initialization subsystem, the initialization process according to the processing system provider initialization path by executing the processing system provider boot firmware volume, the processing system provider setup firmware volume, and the at least one processing system update firmware volume in an order defined by the processing system provider initialization path information; and receiving, by the initialization subsystem, a second initialization path instruction to perform the initialization process according to a computing device provider initialization path that is included in the plurality of different initialization paths and that is configured to initialize the computing device, cause the computing device to enter a runtime state, and provide computing device provider functionality that is different than functionality provided by the other initialization paths included in the plurality of different initialization paths and, in response to receiving the second initialization path instruction:

identifying, by the initialization subsystem in the initialization path database for the computing device provider initialization path, computing device provider initialization path information that identifies the computing device provider boot firmware volume, the computing device provider setup firmware volume, and the at least one processing system update firmware volume for the computing device provider initialization path;

retrieving, by the initialization subsystem from the initialization firmware volume database, the computing device provider boot firmware volume, the computing device provider setup firmware volume, and the at least one processing system update firmware volume identified by the computing device provider initialization path information; and performing, by the initialization subsystem, the initialization process according to the computing device provider initialization path by executing the computing device provider boot firmware volume, the computing device provider setup firmware volume, and the at least one processing system update firmware volume in an order defined by the computing device provider initialization path information.

15. The method of claim 14, further comprising:

receiving, by the initialization subsystem, a third initialization path instruction to perform the initialization process according to a cloud provider initialization path that is included in the plurality of different initialization paths and that is configured to initialize the computing device, cause the computing device to enter a runtime state, and provide cloud provider functionality that is different than functionality provided by the other initialization paths included in a plurality of different initialization paths and, in response to receiving the third initialization path instruction:

identifying, by the initialization subsystem in the initialization path database for the cloud initialization path, cloud initialization path information that identifies a platform driver firmware volume, the at least one processing system update firmware volume, and a cloud driver firmware volume;

retrieving, by the initialization subsystem from the initialization firmware volume database, the platform driver firmware volume, the at least one processing system update firmware volume, and the cloud driver firmware volume identified by the cloud initialization path information; and performing, by the initialization subsystem, the initialization process according to the cloud initialization path by executing the platform driver firmware volume, the at least one processing system update firmware volume, and the cloud driver firmware volume in an order defined by the cloud initialization path information.

16. The method of claim 14, wherein the at least one storage device includes a Serial Peripheral Interface (SPI) storage device.

17. The method of claim 14, wherein the initialization subsystem is provided using a single initialization engine image that provides initialization engine firmware configured to initialize the computing device via any one of the plurality of different initialization paths using respective initialization firmware volumes retrieved from the initialization firmware volume database.

18. The method of claim 14, wherein the initialization subsystem is configured to receive the first initialization path instruction during runtime of the computing device via a Baseboard Management Controller (BMC) device, an operating system, or an application, and cause the computing device to reboot to perform the initialization process according to the processing system provider initialization path or the computing device provider initialization path identified by the first initialization path instruction.

19. The method of claim 14, wherein the plurality of different initialization paths includes a plurality of processing system provider initialization paths that are each available for provisioning in an initialization path instruction and that each enable different processing system functionality in the computing device.

20. The method of claim 14, wherein the plurality of initialization firmware volumes includes initialization feature firmware volumes that provide BIOS or UEFI features for the computing device, and wherein at least one of the processing system provider initialization path information or the computing device provider initialization path information identifies at least one of the initialization feature firmware volumes for retrieval from the initialization firmware volume database and execution during the initialization process.

* * * * *